US006354673B1

(12) United States Patent
Feigel et al.

(10) Patent No.: US 6,354,673 B1

(45) Date of Patent: Mar. 12, 2002

(54) ARRANGEMENT FOR ACTUATING A MOTOR VEHICLE BRAKING SYSTEM

(75) Inventors: Hans-Jörg Feigel, Rosbach; Ulrich Neumann, Rossdorf, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/269,836

(22) PCT Filed: Sep. 25, 1997

(86) PCT No.: PCT/EP97/05264

§ 371 Date: Jun. 11, 1999

§ 102(e) Date: Jun. 11, 1999

(87) PCT Pub. No.: WO98/14355

PCT Pub. Date: Apr. 9, 1998

(30) Foreign Application Priority Data

Oct. 2, 1996 (DE) .......................................... 196 40 767

(51) Int. Cl.[7] .................................................. B60T 8/34

(52) U.S. Cl. .................................. 303/113.4; 303/116.1

(58) Field of Search ........................... 303/116.1, 116.2, 303/113.4, 113.1, 114.1, DIG. 11; 60/591, 592, 572

(56) References Cited

U.S. PATENT DOCUMENTS 4,253,306 A * 3/1981 Kuroki ........................ 60/591
4,708,404 A * 11/1987 Seibert et al. ........... 303/114.1
4,787,685 A * 11/1988 Klein ...................... 303/114.1
5,567,021 A * 10/1996 Gaillard ................... 303/113.4
5,941,608 A * 8/1999 Campau et al. .......... 303/113.4
6,033,036 A * 3/2000 Ruffer et al. ............ 303/114.1

FOREIGN PATENT DOCUMENTS

| | | |
|---|---|---|
| DE | 43 43 314 | 6/1995 |
| DE | 44 25 477 | 1/1996 |
| DE | 195 46 647 | 6/1997 |
| EP | 07 08 006 | 4/1996 |
| GB | 2 178 497 | 2/1987 |

OTHER PUBLICATIONS

Search Report of the German Patent Office for German Appl. No. 19640 767.2.

* cited by examiner

*Primary Examiner*—Douglas C. Butler
*Assistant Examiner*—Robert A. Siconolfi
(74) *Attorney, Agent, or Firm*—Rader, Fishman & Grauer PLLC

(57) ABSTRACT

The present invention relates to an arrangement for actuating an automotive vehicle brake system of the type 'brake-by-wire', which comprises an actuating pedal and a travel simulator which cooperates with the brake pedal and whose simulator piston is in a force-transmitting connection with the actuating pedal and is preloaded by a spring, and which includes means of attenuating the movement of the simulator piston as a function of the actuating pedal travel.

To achieve an effective attenuation, according to the present invention, the simulator piston (11) delimits a hydraulic chamber (12) which is connected to a second hydraulic chamber (4 or 14, respectively) by way of at least one variable flow resistance (16,17,18,19,20).

15 Claims, 3 Drawing Sheets

F_B
II
I
0
s_B

F_D
0
s_B v_B
0
s_B

A_Bl
0
s_B

ARRANGEMENT FOR ACTUATING A MOTOR VEHICLE BRAKING SYSTEM

The present invention relates to an arrangement for actuating an automotive vehicle brake system of the type 'brake-by-wire', comprised of an actuating pedal and a travel simulator which cooperates with the brake pedal and whose simulator piston is in a force-transmitting connection with the actuating pedal and is preloaded by a spring, and which includes means of attenuating the movement of the simulator piston as a function of the actuating pedal travel.

An arrangement of this type is disclosed in EP 0 708 06 A1. The degree of attenuation of the prior art arrangement, which is mainly comprised of an actuating pedal, a travel simulator configured as a resiliently preloaded simulator piston, and a damper, may be varied as a function of the pedal actuating speed or the pedal actuating travel. The above mentioned publication, however, does not indicate any specific designs of the attenuating means which are responsive to the actuating pedal travel.

Therefore, an object of the present invention is to provide means permitting an effective attenuation of the movement of the travel simulator piston as a function of the actuating pedal travel.

This object is achieved according to the present invention in that the simulator piston delimits a hydraulic chamber which is connected to an unpressurized pressure fluid supply reservoir by way of at least one variable flow resistance. A pleasant, normal pedal feeling is imparted to the vehicle driver during operation due to this measure.

Preferred aspects of the object of the present invention are listed in the subclaims 2 to 14.

Further details, features and advantages of the present invention can be seen in the following description of three embodiments, making reference to the accompanying drawings. In the drawings.

Figure 3:
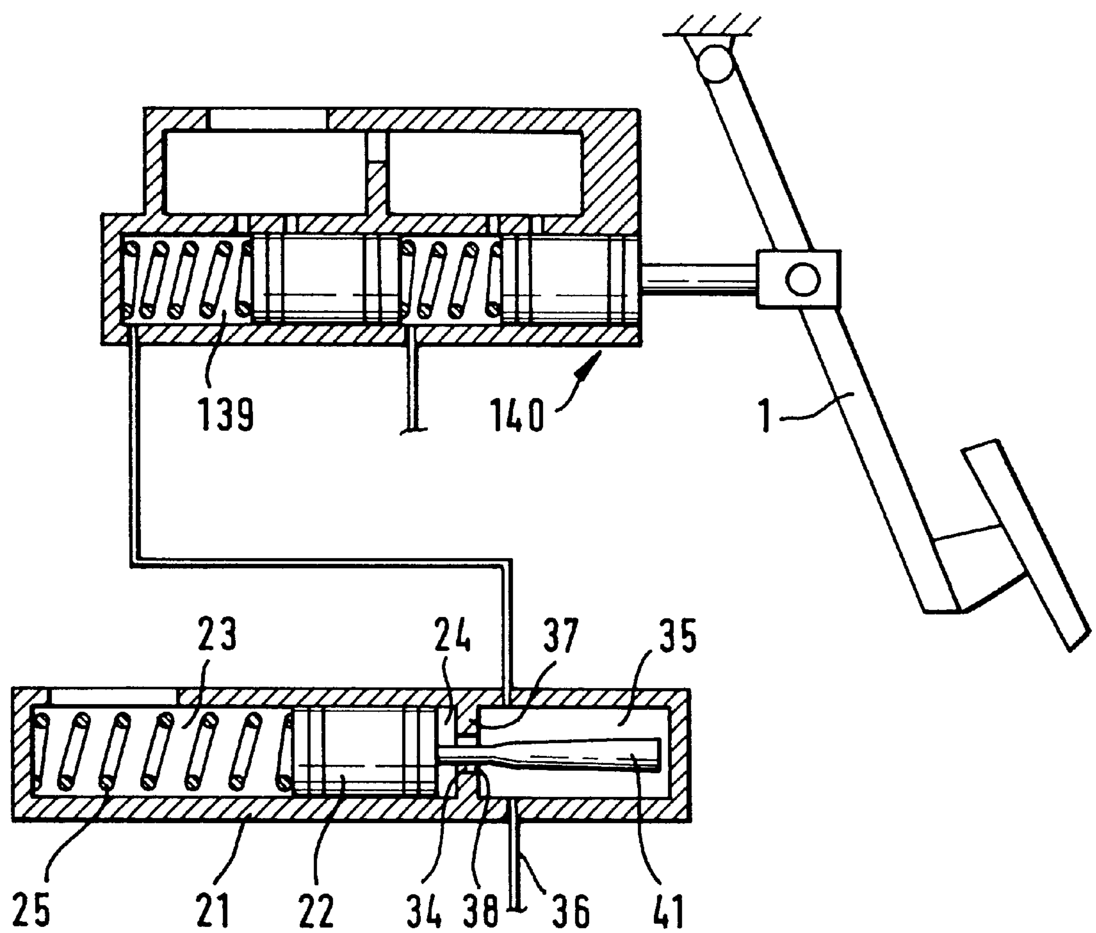
Figure 4A:
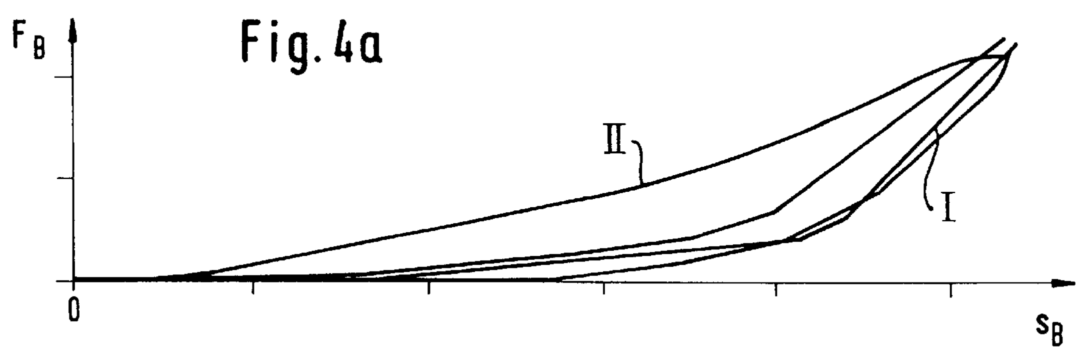

FIGS. 4*a,b,c,d* are diagram views showing the function of the arrangement according to FIG. 3.

Figure 1:
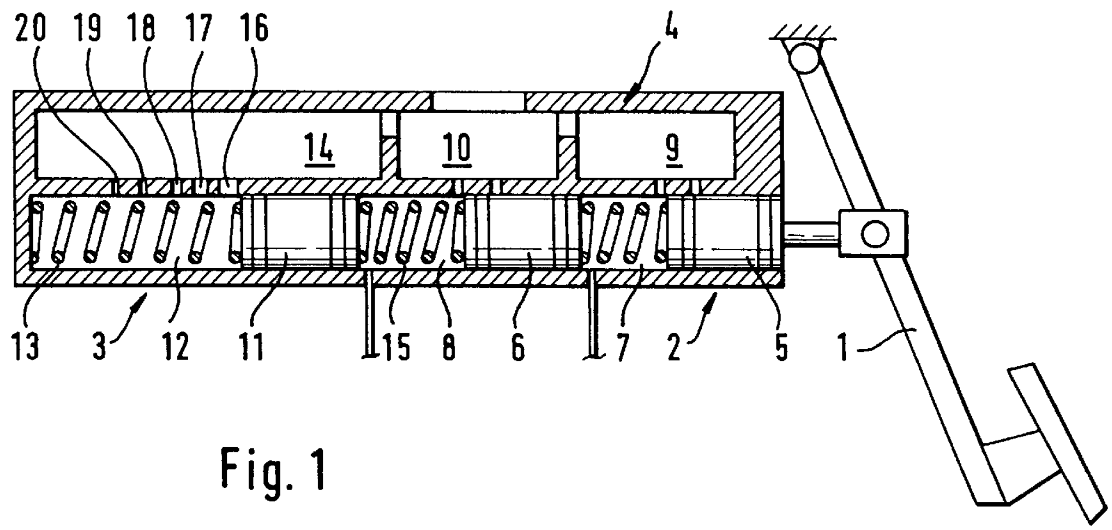
FIG. 1 is a first embodiment of the arrangement of the present invention for actuating an automotive vehicle brake system of the type 'brake-by-wire'.

The first embodiment of the arrangement of the present invention for actuating an automotive vehicle brake system, as shown in FIG. 1, is generally composed of an actuating pedal, preferably a brake pedal 1, an emergency braking pressure generator, preferably a master brake cylinder 2 in tandem design, which is connected downstream of the brake pedal 1 in terms of effect, and a travel simulator 3 which cooperates with the brake pedal 1 respectively the tandem master cylinder 2. As is known in the art, the tandem master cylinder 2 includes two serially arranged pistons 5, 6 which delimit two pressure chambers 7, 8 being in communication with chambers 9,10 of an unpressurized pressure fluid supply reservoir 4 associated with the tandem master cylinder 2. The travel simulator 3 which is connected downstream of the tandem master cylinder 2 in terms of effect and is preferably integrated in the housing of the tandem master cylinder 2 comprises a simulator piston 11 and a simulator spring 13 which biasses the simulator piston 11. The simulator piston 11 on which a compression spring 15 which biasses the second (secondary) piston 6 of the tandem master cylinder 2 is supported, delimits a hydraulic chamber 12 which accommodates the simulator spring 13. The hydraulic chamber 12 is in connection to a third chamber 14 of the pressure fluid supply reservoir 4 by way of passages or bores 16, 17, 18, 19, 20 of varying diameters which provide a variable flow resistance. The arrangement of the bores is preferably chosen such that the bores 16, 17 of large diameter are associated with small actuating travels, i.e., low vehicle decelerations, and the bores 19, 20 of small diameter are provided in an area which can be reached by the simulator piston 11 by covering medium to long actuating travels so that medium and high vehicle decelerations can be achieved relatively quickly. These measures permit the driver a quick actuation of the arrangement of the present invention to any desired value, without overswings.

Figure 2:
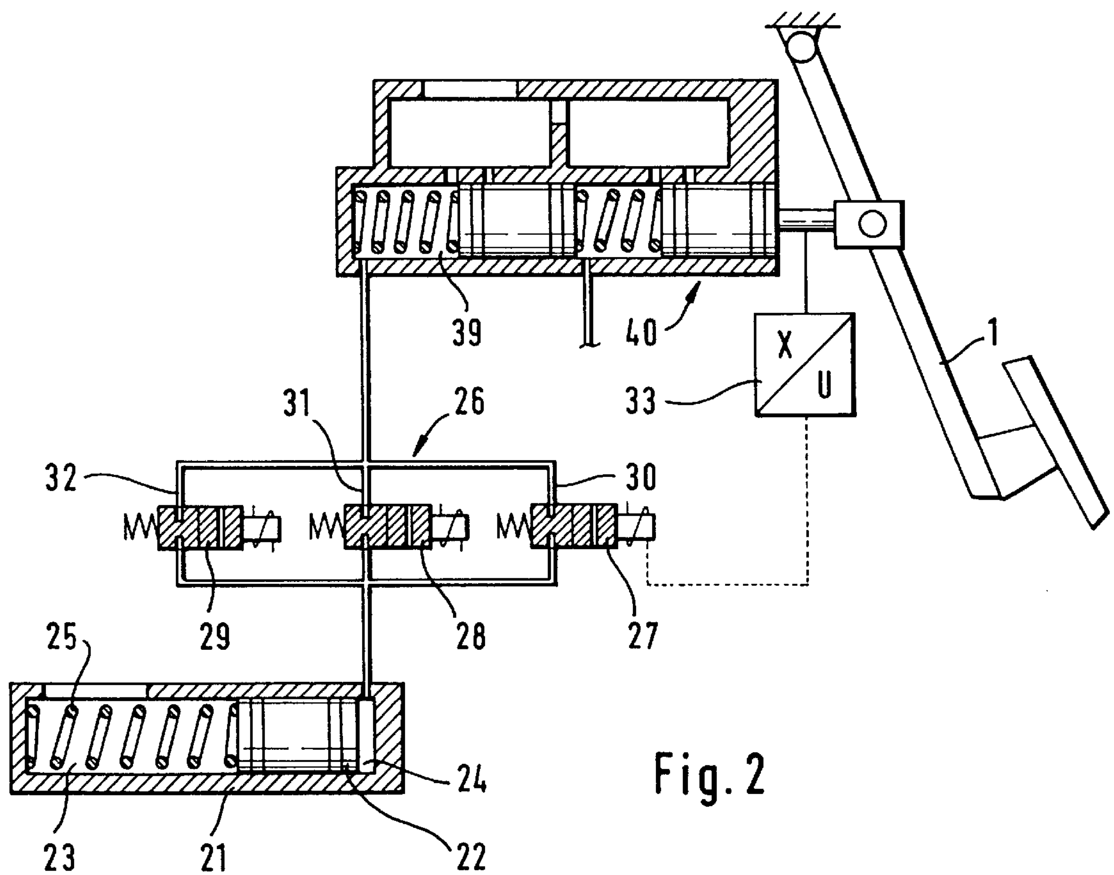
FIGS. 2 and 3 are views of second and third embodiments of the arrangement of the present invention for actuating an automotive vehicle brake system of the type 'brake-by-wire'.

In the second embodiment of the object of the present invention shown in FIG. 2, the travel simulator 3 is designed separately of the emergency braking pressure generator or tandem master cylinder 40 and comprises a cylinder 21 having its interior subdivided by a simulator piston 22 into a pneumatic chamber 23 and a hydraulic chamber 24. The pneumatic chamber 23 which accommodates the simulator spring 25 is in permanent connection to the atmosphere and the hydraulic chamber 24 is connected to the second (secondary) 9 pressure chamber 39 of the tandem master cylinder 40. The hydraulic connection between the chamber 24 and the pressure chamber 39 is preferably established by way of a valve assembly 26 which, in the embodiment shown, is formed by three valve devices 27, 28, 29. The valve devices 27, 28, 29 are formed of electromagnetically operable, preferably normally closed (NC) two-way/two-position directional control valves which are inserted into three parallel connected line portions 30, 31, 32. When the actuating arrangement of the present invention is actuated, the two-way/two-position directional control valves 27, 28, 29 are simultaneously actuated or switched to open on command of output signals of a travel sensor or travel/voltage converter 33 which senses the actuating travel of the brake pedal 1. With increasing actuating travel, valves 27, 28, 29 are closed one after the other so that the above-mentioned attenuation effect responsive to the actuating travel is achieved.

In the design variation shown in FIG. 3, the design of the travel simulator 3 is almost identical to that one explained with respect to FIG. 2. The above-mentioned hydraulic chamber 24, however, cooperates with a hydraulic chamber 35 to which the second (secondary) pressure chamber 139 of the tandem master cylinder 140 is connected, on the one hand, and a hydraulic line 36 which leads to a non-illustrated wheel brake of the vehicle, on the other hand. The connection between chamber 24 and chamber 35 is preferably made by way of a passage or opening 38 provided in a partition wall 37 interposed between the chambers. Extending through opening 38 is a valve element 39 which has a conical design in its passage area and is in a force-transmitting connection with the simulator piston 22. A translatory movement of the valve element 41 to the left in the drawing causes decrease of the annular slot disposed between the wall of the opening 38 and the valve element 41 so that the flow cross-section of the opening 38 changes and a throttling region 34 is produced which has an extent of opening that is continuously variable in response to the actuating travel.

The operation of the embodiment of the object of the present invention shown in FIG. 3 can be seen in the diagram views shown in FIGS. 4*a–d.*

The curves shown in FIG. 4*a* show the dependence of the actuating force $F_B$, which acts on the brake pedal 1, on the pedal actuating travel $S_B$. The first curve denoted by reference character I shows a quasistatic behavior of an undamped system, and curve II shows the dynamic behavior of the arrangement of the present invention according to FIG. 3.

Figure 4B:
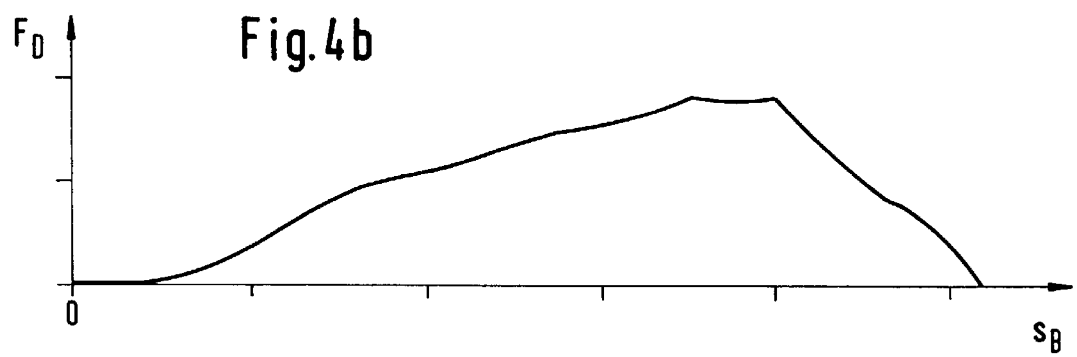

FIG. 4*b* shows the dependence of the damping force $F_D$ produced by the effect of the variable diaphragm 34 on the pedal actuating travel $S_B$, and the curve shown is brought about by subtraction of the curves II-I according to FIG. 4*a*.

Figure 4C:
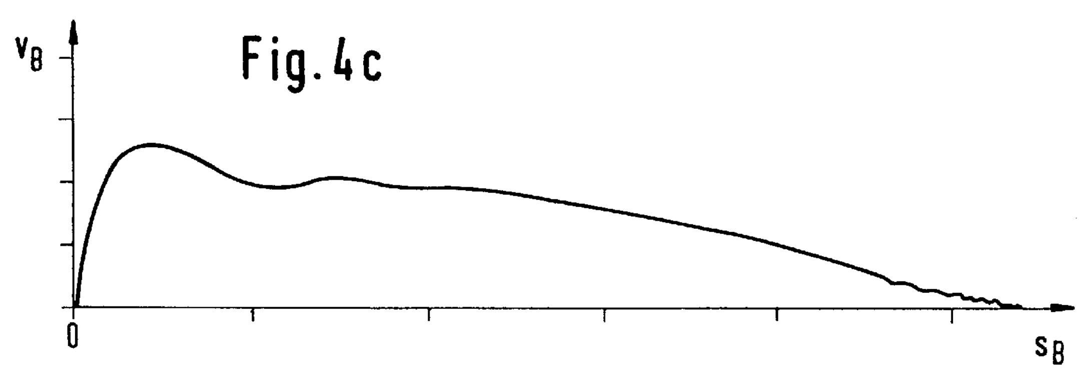
Figure 4D:
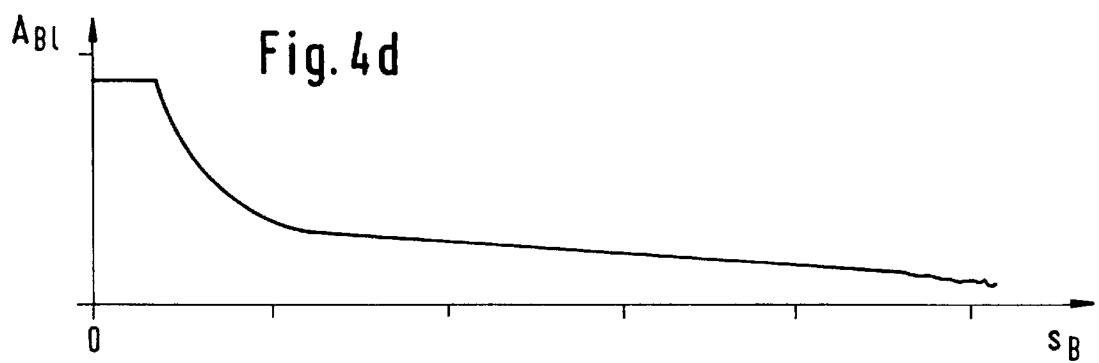

FIG. 4*c* shows the dependence of the pedal actuating speed $v_B$ on the pedal actuating travel $s_B$, and FIG. 4 finally shows the dependence of the flow cross-section $A_{B1}$ of the variable diaphragm 34 on the pedal actuating travel $s_B$ or variations of the flow resistance against the pedal actuating travel $s_B$.

What is claimed is:

1. An automotive vehicle brake system comprising:

an actuating pedal coupled with a travel simulator, wherein said travel simulator includes a simulator piston which is in a force-transmitting connection with the actuating pedal and is preloaded by a spring, means for attenuating the movement of the simulator piston as a function of the actuating pedal travel, wherein the simulator piston delimits a hydraulic chamber which is connected to a second hydraulic chamber by way of at least one variable flow resistance wherein the hydraulic chamber accommodates the spring, wherein the variable flow resistance is provided by bores of varying diameters which are serially arranged in the actuating direction of the simulator piston and can be overridden by said simulator piston.

2. Arrangement as claimed in claim 1, wherein the travel simulator is incorporated in a housing of a hydraulic emergency braking pressure generator which is connected downstream of the actuating pedal, and wherein the second hydraulic chamber is provided by a supply reservoir associated with the emergency pressure generator.

3. Arrangement as claimed in claim 1, wherein the emergency braking pressure generator is configured as a hydraulic cylinder which has at least one piston, wherein the simulator piston is used for the support of a compression spring biassing the piston.

4. Arrangement as claimed in claim 3, wherein the emergency braking pressure generator is configured as a master brake cylinder in tandem design, and in that the supply reservoir includes three chambers, two of which form the master brake cylinder pressure chambers and the third one of which forms the second hydraulic chamber of the travel simulator.

5. Arrangement as claimed in claim 1, wherein the variable flow resistance is provided by several parallel-connected hydraulic lines, in which valve devices are inserted.

6. Arrangement as claimed in claim 5, wherein the valve devices are actuated simultaneously and deactivated serially as a function of the actuating travel of the actuating pedal.

7. Arrangement as claimed in claim 5, wherein the valve devices are provided by electromagnetically operable two-way/two-position directional control valves which can be actuated by output signals of a travel sensor which senses the actuating travel of the actuating pedal.

8. Arrangement as claimed in claim 7, wherein the two-way/two-position directional control valves are configured as normally closed valves.

9. An automotive vehicle brake system comprising:

an actuating pedal coupled with a travel simulator which cooperates with the brake pedal, wherein said travel simulator includes a simulator portion which is in a force-transmitting connection with the actuating pedal and is preloaded by a spring, means for attenuating the movement of the simulator piston as a function of the actuating pedal travel, wherein the simulator piston delimits a hydraulic chamber which is connected to a second hydraulic chamber by way of at least one variable flow resistance, wherein the variable flow resistance is provided by bores of varying diameters which are serially arranged in the actuating direction of the simulator piston and can be overridden by said simulator piston.

10. An automotive vehicle brake system comprising:

an actuating pedal coupled with a travel simulator which cooperates with the brake pedal, wherein said travel simulator includes a simulator portion which is in a force-transmitting connection with the actuating pedal and is preloaded by a spring, means for attenuating the movement of the simulator piston as a function of the actuating pedal travel, wherein the simulator piston delimits a hydraulic chamber which is connected to a second hydraulic chamber by way of at least one variable flow resistance, wherein the travel simulator is incorporated in a housing of a hydraulic emergency braking pressure generator which is connected downstream of the actuating pedal, and wherein the second hydraulic chamber is provided by a supply reservoir associated with the emergency braking pressure generator.

11. An automotive vehicle brake system comprising:

an actuating pedal coupled with a travel simulator which cooperates with the brake pedal, wherein said travel simulator includes a simulator portion which is in a force-transmitting connection with the actuating pedal and is preloaded by a spring, means for attenuating the movement of the simulator piston as a function of the actuating pedal travel, wherein the simulator piston delimits a hydraulic chamber which is connected to a second hydraulic chamber by way of at least one variable flow resistance wherein the variable flow resistance is provided by several parallel-connected hydraulic lines, in which valve devices are inserted, wherein the valve devices are provided by electromagnetically operable two-way/two-position directional control valves which can be actuated by output signals of a travel sensor which senses the actuating travel of the actuating pedal.

12. Arrangement as claimed in claim 11, wherein the valve devices are actuated simultaneously and deactivated serially as a function of the actuating travel of the actuating pedal.

13. Arrangement as claimed in claim 12, wherein the two-way/two-position directional control valves are configured as normally closed valves.

14. An automotive vehicle brake system comprising:

an actuating pedal coupled with a travel simulator, wherein said travel simulator includes a simulator piston which is in a force-transmitting connection with the actuating pedal and is preloaded by a spring, means for attenuating the movement of the simulator piston as a function of the actuating pedal travel, wherein the simulator piston delimits a hydraulic chamber which is connected to a second hydraulic chamber by way of at least one variable flow resistance wherein the hydraulic chamber accommodates the spring, wherein the travel simulator is incorporated in a housing of a hydraulic emergency braking pressure generator which is connected downstream of the actuating pedal, and wherein the second hydraulic chamber is provided by a supply reservoir associated with the emergency braking pressure generator.

15. An automotive vehicle brake system comprising:

an actuating pedal coupled with a travel simulator, wherein said travel simulator includes a simulator piston which is in a force-transmitting connection with the actuating pedal and is preloaded by a spring, means for attenuating the movement of the simulator piston as a function of the actuating pedal travel, wherein the simulator piston delimits a hydraulic chamber which is connected to a second hydraulic chamber by way of at least one variable flow resistance wherein the hydraulic chamber accommodates the spring, wherein the variable flow resistance is provided by several parallel-connected hydraulic lines, in which valve devices are inserted, wherein the valve devices are provided by electromagnetically operable two-way/two-position directional control valves which can be actuated by output signals of a travel sensor which senses the actuating travel of the actuating pedal.

* * * * *